US010683694B2

United States Patent
Iwamoto et al.

(10) Patent No.: US 10,683,694 B2
(45) Date of Patent: Jun. 16, 2020

(54) INTERLAYER FOR LAMINATED GLASS, AND LAMINATED GLASS

(71) Applicant: SEKISUI CHEMICAL CO., LTD., Osaka, Osaka (JP)

(72) Inventors: Tatsuya Iwamoto, Kouka (JP); Nami Minakuchi, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/745,969

(22) PCT Filed: Sep. 8, 2016

(86) PCT No.: PCT/JP2016/076449
§ 371 (c)(1),
(2) Date: Jan. 18, 2018

(87) PCT Pub. No.: WO2017/043574
PCT Pub. Date: Mar. 16, 2017

(65) Prior Publication Data
US 2018/0209207 A1    Jul. 26, 2018

(30) Foreign Application Priority Data
Sep. 11, 2015  (JP) ................................. 2015-180218

(51) Int. Cl.
*B32B 27/08* (2006.01)
*E06B 3/67* (2006.01)
(Continued)

(52) U.S. Cl.
CPC .............. *E06B 3/6707* (2013.01); *B32B 7/02* (2013.01); *B32B 17/10036* (2013.01);
(Continued)

(58) Field of Classification Search
None
See application file for complete search history.

(56) References Cited

U.S. PATENT DOCUMENTS 8,795,821 B2    8/2014 Shimamoto et al.
2013/0149503 A1  6/2013 Yamamoto et al.
(Continued)

FOREIGN PATENT DOCUMENTS

EP    1 281 690 A1    2/2003
EP    2520552 A1 *  11/2012  ....... B32B 17/10761
(Continued)

OTHER PUBLICATIONS

Written Opinion of the International Searching Authority (PCT/ISA/237) for Application No. PCT/JP2016/076449 dated Nov. 8, 2016 (English Translation dated Mar. 22, 2018).
(Continued)

*Primary Examiner* — Callie E Shosho
*Assistant Examiner* — Krupa Shukla
(74) *Attorney, Agent, or Firm* — Cheng Law Group, PLLC

(57) ABSTRACT

An interlayer film for laminated glass includes first, second, and third layers containing a thermoplastic resin and a plasticizer. The cloud point of the first layer is lower than both the cloud point of the second layer and the cloud point of the third layer. Both the absolute value XA of a difference between the cloud point of the first layer and the cloud point of the second layer and the absolute value XB of a difference between the cloud point of the first layer and the cloud point of the third layer are 118° C. or more, and when a content of the plasticizer in the interlayer film for laminated glass relative to 100 parts by weight of the thermoplastic resin in the interlayer film for laminated glass is defined as Y, Y≤−0.16 XA+60 and Y≤−0.16XB+60.

15 Claims, 1 Drawing Sheet

(51) Int. Cl.
  B32B 27/00    (2006.01)
  B32B 7/02     (2019.01)
  B32B 17/10    (2006.01)
  B32B 27/30    (2006.01)
  B60J 1/00     (2006.01)
  E06B 3/66     (2006.01)
(52) U.S. Cl.
  CPC .. *B32B 17/10605* (2013.01); *B32B 17/10761* (2013.01); *B32B 27/00* (2013.01); *B32B 27/08* (2013.01); *B32B 27/306* (2013.01); *B60J 1/001* (2013.01); *E06B 3/6608* (2013.01); *B32B 2250/05* (2013.01); *B32B 2250/40* (2013.01); *B32B 2307/546* (2013.01); *B32B 2605/006* (2013.01)

(56) References Cited

U.S. PATENT DOCUMENTS

| | | |
|---|---|---|
| 2013/0236711 A1 | 9/2013 | Lu |
| 2015/0079366 A1 | 3/2015 | Lu |
| 2015/0079373 A1 | 3/2015 | Lu |
| 2016/0200076 A1 | 7/2016 | Lu |
| 2017/0100918 A1 | 4/2017 | Lu |
| 2017/0100919 A1 | 4/2017 | Lu |

FOREIGN PATENT DOCUMENTS

| | | |
|---|---|---|
| JP | 2001-48600 A | 2/2001 |
| JP | 2004-67427 A | 3/2004 |
| JP | 2007-70200 A | 3/2007 |
| JP | 2013-6727 A | 1/2013 |
| JP | 2015-516934 A | 6/2015 |
| WO | WO-2012/141002 A1 | 10/2012 |

OTHER PUBLICATIONS

International Search Report for the Application No. PCT/JP2016/076449 dated Nov. 8, 2016.
Written Opinion of the International Searching Authority (PCT/ISA/237) for Application No. PCT/JP2016/076449 dated Nov. 8, 2016.
Supplementary European Search Report for the Application No. EP 16 844 435.4 dated Apr. 8, 2019.

* cited by examiner

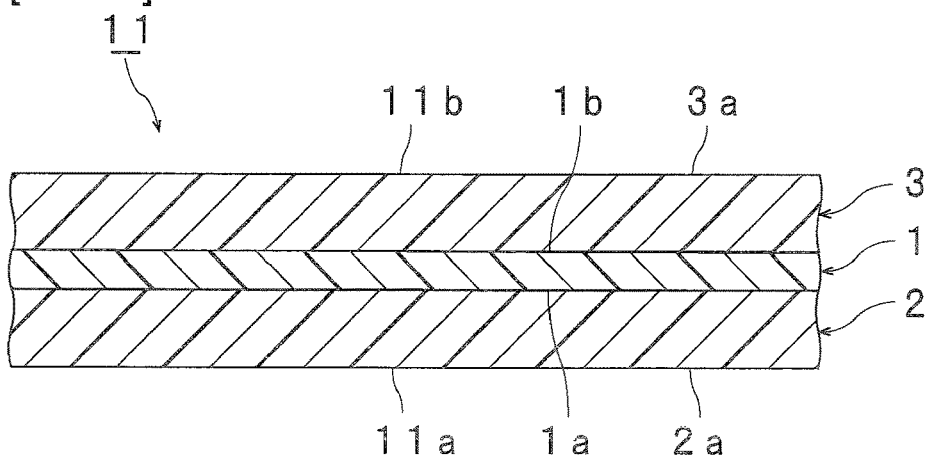
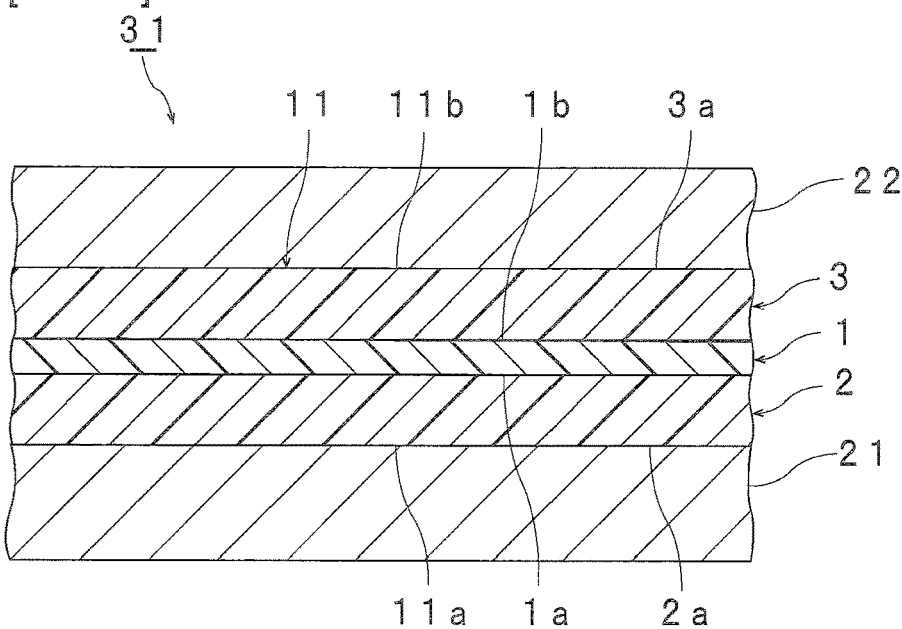
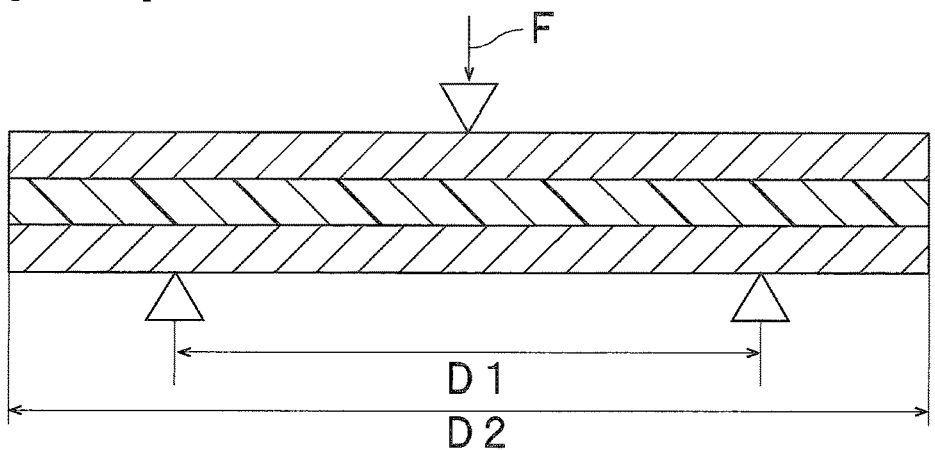

ововооThe present invention relates to an interlayer film for laminated glass which is used for obtaining laminated glass. Moreover, the present invention relates to laminated glass prepared with the interlayer film for laminated glass.

INTERLAYER FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings, and the like. The laminated glass is produced by sandwiching an interlayer film for laminated glass between two glass plates.

Examples of the interlayer film for laminated glass include a single-layered interlayer film having a one-layer structure and a multi-layered interlayer film having a two or more-layer structure.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount more than 30 parts by weight. This sound insulating layer can be used alone as a single-layered interlayer film.

Furthermore, the following Patent Document 1 also describes a multi-layered interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount of 30 parts by weight or less.

The following Patent Document 2 discloses an interlayer film which is constituted of a polymer layer having a glass transition temperature of more than 33° C. In Patent Document 2, a technique of arranging the polymer layer between glass plates with a thickness of 4.0 mm or less is described.

RELATED ART DOCUMENTS

Patent Documents

Patent Document 1: JP 2007-070200 A
Patent Document 2: US 2013/0236711 A1

SUMMARY OF THE INVENTION

Problems to be Solved by the Invention

With regard to laminated glass prepared with such conventional interlayer films described in Patent Documents 1 and 2, there are cases where the laminated glass is low in flexural rigidity. As such, for example, when laminated glass is used for a side door of an automobile, laminated glass with no fixing frame sometimes causes troubles in opening/closing of the glass due to the deflection attributed to the low rigidity of the laminated glass.

Moreover, in recent years, for the purpose of attaining reduced weight of laminated glass, use of thin glass has been desired. In laminated glass prepared with an interlayer film sandwiched between two glass plates, when the thickness of the glass plate is thinned, there is a problem that maintaining the flexural rigidity sufficiently high is difficult.

Laminated glass can be reduced in weight as long as the rigidity of laminated glass, even with the thin glass plates, can be enhanced by virtue of the interlayer film. When laminated glass is light in weight, the amount of the material used for the laminated glass can be decreased to reduce the environmental load. Furthermore, when laminated glass being light in weight is used for an automobile, the fuel consumption can be improved, and as a result, the environmental load can be reduced.

Moreover, with respect to laminated glass prepared with an interlayer film, in addition to being high in flexural rigidity, being also high in sound insulating properties is desired. In Patent Document 1, although laminated glass being high in sound insulating properties has been disclosed, making the laminated glass high in flexural rigidity is difficult. In Patent Document 2, an interlayer film in which a polymer layer having a glass transition temperature of more than 33° C. and a polymer layer having a glass transition temperature of less than 20° C. are layered has been disclosed. However, in laminated glass prepared with an interlayer film disclosed in Patent Document 2, the flexural rigidity of laminated glass immediately after the preparation fails to become sufficiently high, and in addition, there is a problem that the flexural rigidity of laminated glass after a certain period of time has elapsed from the preparation is significantly lowered as compared to laminated glass immediately after the preparation.

An object of the present invention is to provide an interlayer film for laminated glass with which not only the flexural rigidity of laminated glass immediately after the preparation but also the flexural rigidity of laminated glass after a certain period of time has elapsed from the preparation can be enhanced and the sound insulating properties of laminated glass can be enhanced. Moreover, the present invention is also aimed at providing laminated glass prepared with the interlayer film for laminated glass.

Means for Solving the Problems

According to a broad aspect of the present invention, there is provided an interlayer film for laminated glass, which has a three or more-layer structure and contains a thermoplastic resin and a plasticizer, including a first layer containing a thermoplastic resin and a plasticizer, a second layer being layered on a first surface of the first layer and containing a thermoplastic resin and a plasticizer, and a third layer being layered on a second surface opposite to the first surface of the first layer and containing a thermoplastic resin and a plasticizer, Cloud point 1 determined with the use of a liquid prepared by dissolving 8 parts by weight of the thermoplastic resin for the first layer in 100 parts by weight of the plasticizer for the first layer being lower than each of Cloud point 2 determined with the use of a liquid prepared by dissolving 8 parts by weight of the thermoplastic resin for the second layer in 100 parts by weight of the plasticizer for the second layer and Cloud point 3 determined with the use of a liquid prepared by dissolving 8 parts by weight of the thermoplastic resin for the third layer in 100 parts by weight of the plasticizer for the third layer, each of Absolute value XA of a difference between the Cloud point 1 and the Cloud point 2 and Absolute value XB of a difference between the Cloud point 1 and the Cloud point 3 being 118° C. or more, and when a content of the plasticizer in the interlayer film for laminated glass relative to 100 parts by weight of the thermoplastic resin in the interlayer film for laminated glass is defined as Y, XA, XB, and Y satisfying the equations of Y≤−0.16XA+60 and Y≤−0.16XB+60.

In a specific aspect of the interlayer film for laminated glass according to the present invention, the content of the plasticizer in the first layer relative to 100 parts by weight of the thermoplastic resin in the first layer is larger than the content of the plasticizer in the second layer relative to 100 parts by weight of the thermoplastic resin in the second layer.

In a specific aspect of the interlayer film for laminated glass according to the present invention, the content of the plasticizer in the first layer relative to 100 parts by weight of the thermoplastic resin in the first layer is larger than the content of the plasticizer in the third layer relative to 100 parts by weight of the thermoplastic resin in the third layer.

In a specific aspect of the interlayer film for laminated glass according to the present invention, the Cloud point 1 is 0° C. or more and 40° C. or less. In a specific aspect of the interlayer film for laminated glass according to the present invention, the Cloud point 1 is more than 5° C. and 30° C. or less.

In a specific aspect of the interlayer film for laminated glass according to the present invention, each of the Cloud point 2 and the Cloud point 3 is 125° C. or more and 180° C. or less. In a specific aspect of the interlayer film for laminated glass according to the present invention, each of the Cloud point 2 and the Cloud point 3 is 135° C. or more and 170° C. or less.

In a specific aspect of the interlayer film for laminated glass according to the present invention, the content of the plasticizer in the first layer relative to 100 parts by weight of the thermoplastic resin in the first layer is 55 parts by weight or more and 100 parts by weight or less. In a specific aspect of the interlayer film for laminated glass according to the present invention, each of the content of the plasticizer in the second layer relative to 100 parts by weight of the thermoplastic resin in the second layer and the content of the plasticizer in the third layer relative to 100 parts by weight of the thermoplastic resin in the third layer is 50 parts by weight or less.

In a specific aspect of the interlayer film for laminated glass according to the present invention, the content Y of the plasticizer in the interlayer film for laminated glass relative to 100 parts by weight of the thermoplastic resin in the interlayer film for laminated glass is 25 parts by weight or more and 40 parts by weight or less.

In a specific aspect of the interlayer film for laminated glass according to the present invention, the thermoplastic resin in the first layer is a polyvinyl acetal resin, the thermoplastic resin in the second layer is a polyvinyl acetal resin, and the thermoplastic resin in the third layer is a polyvinyl acetal resin.

In a specific aspect of the interlayer film for laminated glass according to the present invention, the content of the hydroxyl group of the polyvinyl acetal resin in the first layer is lower than the content of the hydroxyl group of the polyvinyl acetal resin in the second layer.

In a specific aspect of the interlayer film for laminated glass according to the present invention, the interlayer film for laminated glass is used together with a first glass plate having a thickness of less than 2 mm and is arranged between the first glass plate and a second glass plate to obtain laminated glass.

According to a broad aspect of the present invention, there is provided laminated glass including a first lamination glass member, a second lamination glass member, and the above-described interlayer film for laminated glass, the interlayer film for laminated glass being arranged between the first lamination glass member and the second lamination glass member.

In a specific aspect of the laminated glass according to the present invention, the first lamination glass member is a first glass plate and the thickness of the first glass plate is less than 2 mm.

Effect of the Invention

Since the interlayer film for laminated glass according to the present invention is an interlayer film for laminated glass having a three or more-layer structure and includes a first layer containing a thermoplastic resin and a plasticizer, a second layer being layered on a first surface of the first layer and containing a thermoplastic resin and a plasticizer, and a third layer being layered on a second surface opposite to the first surface of the first layer and containing a thermoplastic resin and a plasticizer, Cloud point 1 determined with the use of a liquid prepared by dissolving 8 parts by weight of the thermoplastic resin for the first layer in 100 parts by weight of the plasticizer for the first layer is lower than each of Cloud point 2 determined with the use of a liquid prepared by dissolving 8 parts by weight of the thermoplastic resin for the second layer in 100 parts by weight of the plasticizer for the second layer and Cloud point 3 determined with the use of a liquid prepared by dissolving 8 parts by weight of the thermoplastic resin for the third layer in 100 parts by weight of the plasticizer for the third layer, each of Absolute value XA of a difference between the Cloud point 1 and the Cloud point 2 and Absolute value XB of a difference between the Cloud point 1 and the Cloud point 3 is 118° C. or more, and when a content of the plasticizer in the interlayer film for laminated glass relative to 100 parts by weight of the thermoplastic resin in the interlayer film for laminated glass is defined as Y, XA, XB, and Y satisfy the equations of Y≤−0.16XA+60 and Y≤−0.16XB+60, not only the flexural rigidity of laminated glass immediately after the preparation but also the flexural rigidity of laminated glass after a certain period of time has elapsed from the preparation can be enhanced and the sound insulating properties of laminated glass can be enhanced.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an example of laminated glass prepared with the interlayer film for laminated glass shown in FIG. 1.

FIG. 3 is a schematic view for illustrating a measurement method for the flexural rigidity.

MODE(S) FOR CARRYING OUT THE INVENTION

Hereinafter, the present invention will be described in detail.

The interlayer film for laminated glass (in the present specification, sometimes abbreviated as "the interlayer film") according to the present invention has a three or more-layer structure. The interlayer film according to the present invention may have a three-layer structure and may have a four or more-layer structure. The interlayer film according to the present invention is provided with a first layer containing a thermoplastic resin and a plasticizer. For example, it is preferred that the interlayer film according to the present invention be provided with a first layer containing a thermoplastic resin and a plasticizer, a second layer being layered on a first surface of the first layer and containing a thermoplastic resin and a plasticizer, and a third layer being layered on a second surface opposite to the first surface of the first layer and containing a thermoplastic resin and a plasticizer. The second layer may be an outermost layer and an additional layer may be layered at the opposite side of the face on which the first layer is layered of the second layer. The third layer may be an outermost layer and an additional layer may be layered at the opposite side of the face on which the first layer is layered of the third layer.

In the interlayer film according to the present invention, Cloud point 1 determined with the use of a liquid prepared by dissolving 8 parts by weight of the thermoplastic resin for the first layer in 100 parts by weight of the plasticizer for the first layer is lower than each of Cloud point 2 determined with the use of a liquid prepared by dissolving 8 parts by weight of the thermoplastic resin for the second layer in 100 parts by weight of the plasticizer for the second layer and Cloud point 3 determined with the use of a liquid prepared by dissolving 8 parts by weight of the thermoplastic resin for the third layer in 100 parts by weight of the plasticizer for the third layer.

In the interlayer film according to the present invention, each of Absolute value XA (unit: ° C.) of a difference between the Cloud point 1 and the Cloud point 2 and Absolute value XB (unit: ° C.) of a difference between the Cloud point 1 and the Cloud point 3 is 118° C. or more, and when a content of the plasticizer in the interlayer film for laminated glass relative to 100 parts by weight of the thermoplastic resin in the interlayer film for laminated glass is defined as Y (unit: parts by weight), XA, XB, and Y satisfy the equations of $Y \leq -0.16XA+60$ and $Y \leq -0.16XB+60$.

Since the interlayer film according to the present invention is provided with the above-mentioned configuration, not only the flexural rigidity of laminated glass immediately after being prepared with an interlayer film but also the flexural rigidity of laminated glass after a certain period of time has elapsed from the preparation can be enhanced and the sound insulating properties of laminated glass can be enhanced. Moreover, there are many cases in which the interlayer film is arranged between a first glass plate and a second glass plate to obtain laminated glass. Even when the thickness of a first glass plate is thinned, by the use of the interlayer film according to the present invention, the flexural rigidity of laminated glass can be sufficiently enhanced. Moreover, even when the thicknesses of both a first glass plate and a second glass plate are thinned, by the use of the interlayer film according to the present invention, the flexural rigidity of laminated glass can be sufficiently enhanced. In this connection, when the thicknesses of both a first glass plate and a second glass plate are thickened, the flexural rigidity of laminated glass is further enhanced.

Furthermore, since the interlayer film according to the present invention is provided with the above-mentioned configuration, the sound insulating properties of laminated glass prepared with the interlayer film can also be enhanced.

It is preferred that a surface at a side opposite to the first layer side of the second layer be a surface on which a lamination glass member or a glass plate is layered. It is preferred that the thickness of a glass plate to be layered on the second layer be less than 2 mm (preferably 1 mm or less). It is preferred that a surface at a side opposite to the first layer side of the third layer be a surface on which a lamination glass member or a glass plate is layered. It is preferred that the thickness of a glass plate to be layered on the third layer be less than 2 mm (preferably 1 mm or less).

Since the flexural rigidity can be sufficiently enhanced by virtue of the interlayer film, with the use of a first glass plate having a thickness of less than 2 mm (preferably 1 mm or less), the interlayer film is arranged between the first glass plate and a second glass plate to suitably obtain laminated glass. Since the flexural rigidity can be sufficiently enhanced by virtue of the interlayer film, with the use of a first glass plate having a thickness of less than 2 mm (preferably 1 mm or less) and a second glass plate having a thickness of less than 2 mm (preferably 1 mm or less), the interlayer film is arranged between the first glass plate and the second glass plate to more suitably obtain laminated glass.

Hereinafter, specific embodiments of the present invention will be described with reference to the drawings.

FIG. 1 shows an interlayer film for laminated glass in accordance with a first embodiment of the present invention schematically represented as a sectional view.

An interlayer film 11 shown in FIG. 1 is a multi-layered interlayer film having a three or more-layer structure. The interlayer film 11 is used for obtaining laminated glass. The interlayer film 11 is an interlayer film for laminated glass. The interlayer film 11 provided with a first layer 1, a second layer 2, and a third layer 3. The second layer 2 is arranged on a first surface 1a of the first layer 1 to be layered thereon. The third layer 3 is arranged on a second surface 1b opposite to the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (a second layer 2/a first layer 1/a third layer 3) in which the second layer 2, the first layer 1, and the third layer 3 are layered in this order.

Hereinafter, the details of the first layer, the second layer and the third layer which constitute the interlayer film according to the present invention, and the details of each ingredient contained in the first layer, the second layer and the third layer will be described.

(Thermoplastic Resin)

The first layer contains a thermoplastic resin (hereinafter, sometimes described as a thermoplastic resin (1)). It is preferred that the first layer contain polyvinyl acetal resin (hereinafter, sometimes described as a polyvinyl acetal resin (1)) as the thermoplastic resin (1). The second layer contains a thermoplastic resin (hereinafter, sometimes described as a thermoplastic resin (2)), and it is preferred that the second layer contain a polyvinyl acetal resin (hereinafter, sometimes described as a polyvinyl acetal resin (2)) as the thermoplastic resin (2). The third layer contains a thermoplastic resin (hereinafter, sometimes described as a thermoplastic resin (3)), and it is preferred that the third layer contain a polyvinyl acetal resin (hereinafter, sometimes described as a polyvinyl acetal resin (3)) as the thermoplastic resin (3). Although the thermoplastic resin (1), the thermoplastic resin (2), and the thermoplastic resin (3) may be the same as or different from one another, it is preferred that the thermoplastic resin (1) be different from the thermoplastic resin (2) and the thermoplastic resin (3) because the sound insulating properties are further enhanced. Although the polyvinyl acetal resin (1), the polyvinyl acetal resin (2), and the polyvinyl acetal resin (3) may be the same as or different from one another, it is preferred that the polyvinyl acetal resin (1) be different from the polyvinyl acetal resin (2) and the polyvinyl acetal resin (3) because the sound insulating properties are further enhanced. One kind of each of the thermoplastic resin (1), the thermoplastic resin (2), and the thermoplastic resin (3) may be used alone and two or more kinds thereof may be used in combination. One kind of each of the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

For example, the polyvinyl acetal resin can be produced by acetalizing polyvinyl alcohol with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally falls within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, and preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

It is preferred that the number of carbon atoms of the acetal group in the polyvinyl acetal resin lie within the range of 3 to 5, and it is preferred that the number of carbon atoms of the acetal group be 4 or 5.

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, decylaldehyde, benzaldehyde, and the like. Of these, acetaldehyde, propionaldehyde, n-butyraldehyde, isobutyraldehyde, n-hexylaldehyde or n-valeraldehyde is preferred, acetaldehyde, propionaldehyde, n-butyraldehyde, isobutyraldehyde or n-valeraldehyde is more preferred, and n-butyraldehyde or n-valeraldehyde is further preferred. One kind of the aldehyde may be used alone, and two or more kinds thereof may be used in combination.

The content of the hydroxyl group (the amount of hydroxyl groups) of the polyvinyl acetal resin (1) is preferably 17% by mole or more, more preferably 20% by mole or more, further preferably 22% by mole or more, and preferably 28% by mole or less, more preferably 27% by mole or less, further preferably 25% by mole or less, and especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating properties of laminated glass are further enhanced. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (2) and the polyvinyl acetal resin (3) is preferably 25% by mole or more, more preferably 28% by mole or more, more preferably 30% by mole or more, even more preferably 31.5% by mole or more, further preferably 32% by mole or more, especially preferably 33% by mole or more, and preferably 40% by mole or less, more preferably 38% by mole or less, further preferably 37% by mole or less, and especially preferably 36% by mole or less. When the content of the hydroxyl group is the above lower limit or more, the flexural rigidity is further enhanced and the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further enhancing the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). From the viewpoint of still further enhancing the sound insulating properties, each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, and most preferably 12% by mole or more. Each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (1) and the content of the hydroxyl group of the polyvinyl acetal resin (3) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more, and preferably 30% by mole or less, more preferably 25% by mole or less, further preferably 24% by mole or less, and especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and 25% by mole or less, the resulting laminated glass is excellent in penetration resistance.

The acetylation degree of each of the polyvinyl acetal resin (2) and the polyvinyl acetal resin (3) is preferably 0.01% by mole or more, more preferably 0.5% by mole or more, and preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably 47% by mole or more, more preferably 60% by mole or more, and preferably 85% by mole or less, more preferably 80% by mole or less and further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, more preferably 60% by mole or more, and preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (1) be a polyvinyl acetal resin (A) with an acetylation degree (a) of less than 8% by mole and an acetalization degree (a) of 65% by mole or more or a polyvinyl acetal resin (B) with an acetylation degree (b) of 8% by mole or more. Each of the polyvinyl acetal resin (2) and the polyvinyl acetal resin (3) may be the polyvinyl acetal resin (A) and may be the polyvinyl acetal resin (B).

The acetylation degree (a) of the polyvinyl acetal resin (A) is less than 8% by mole, preferably 7.9% by mole or less, more preferably 7.8% by mole or less, further preferably 6.5% by mole or less, especially preferably 6% by mole or less, and preferably 0.1% by mole or more, more preferably 0.5% by mole or more, further preferably 2% by mole or more, especially preferably 5% by mole or more, and most preferably 5.5% by mole or more. When the acetylation degree (a) is 0.1% by mole or more and less than 8% by mole, the transfer of a plasticizer can be easily controlled and the sound insulating properties of laminated glass are further enhanced.

The acetalization degree (a) of the polyvinyl acetal resin (A) is 65% by mole or more, preferably 66% by mole or more, more preferably 67% by mole or more, further preferably 67.5% by mole or more, especially preferably 75% by mole or more, and preferably 85% by mole or less, more preferably 84% by mole or less, further preferably 83% by mole or less and especially preferably 82% by mole or less. When the acetalization degree (a) is the above lower limit or more, the sound insulating properties of laminated glass are further enhanced. When the acetalization degree (a) is the above upper limit or less, the reaction time required for producing the polyvinyl acetal resin (A) can be shortened.

The content (a) of the hydroxyl group of the polyvinyl acetal resin (A) is preferably 18% by mole or more, more preferably 19% by mole or more, further preferably 20% by mole or more, especially preferably 21% by mole or more, most preferably 23% by mole or more, and preferably 31% by mole or less, more preferably 30% by mole or less, further preferably 29% by mole or less, and especially preferably 28% by mole or less. When the content (a) of the hydroxyl group is the above lower limit or more, the adhesive force of the first layer is further enhanced. When the content (a) of the hydroxyl group is the above upper limit or less, the sound insulating properties of laminated glass are further enhanced.

The acetylation degree (b) of the polyvinyl acetal resin (B) is 8% by mole or more, preferably 9% by mole or more, more preferably 9.5% by mole or more, further preferably 10% by mole or more, especially preferably 10.5% by mole or more, and preferably 30% by mole or less, more preferably 28% by mole or less, further preferably 26% by mole or less and especially preferably 24% by mole or less. When the acetylation degree (b) is the above lower limit or more, the sound insulating properties of laminated glass are further enhanced. When the acetylation degree (b) is the above upper limit or less, the reaction time required for producing the polyvinyl acetal resin (B) can be shortened.

The acetalization degree (b) of the polyvinyl acetal resin (B) is preferably 50% by mole or more, more preferably 53% by mole or more, further preferably 55% by mole or more, especially preferably 60% by mole or more, and preferably 78% by mole or less, more preferably 75% by mole or less, further preferably 72% by mole or less and especially preferably 70% by mole or less. When the acetalization degree (b) is the above lower limit or more, the sound insulating properties of laminated glass are further enhanced. When the acetalization degree (b) is the above upper limit or less, the reaction time required for producing the polyvinyl acetal resin (B) can be shortened.

The content (b) of the hydroxyl group of the polyvinyl acetal resin (B) is preferably 18% by mole or more, more preferably 19% by mole or more, further preferably 20% by mole or more, especially preferably 21% by mole or more, most preferably 23% by mole or more, and preferably 31% by mole or less, more preferably 30% by mole or less, further preferably 29% by mole or less, and especially preferably 28% by mole or less. When the content (b) of the hydroxyl group is the above lower limit or more, the adhesive force of the first layer is further enhanced. When the content (b) of the hydroxyl group is the above upper limit or less, the sound insulating properties of laminated glass are further enhanced.

It is preferred that each of the polyvinyl acetal resin (A) and the polyvinyl acetal resin (B) be a polyvinyl butyral resin.

(Plasticizer)

The first layer contains a plasticizer (hereinafter, sometimes described as a plasticizer (1)). The second layer contains a plasticizer (hereinafter, sometimes described as a plasticizer (2)). The third layer contains a plasticizer (hereinafter, sometimes described as a plasticizer (3)). By the use of the plasticizer or by using a polyvinyl acetal resin and a plasticizer together, the adhesive force of a layer containing the polyvinyl acetal resin and the plasticizer to a lamination glass member or another layer is moderately enhanced. The plasticizer is not particularly limited. The plasticizer (1), the plasticizer (2), and the plasticizer (3) may be the same as or different from one another. One kind of each of the plasticizer (1), the plasticizer (2), and the plasticizer (3) may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

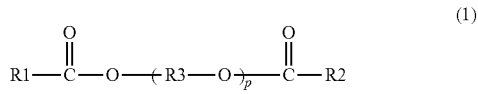

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include di-(2-butoxyethyl)-adipate (DBEA), triethylene glycol di-2-ethylhexanoate (3GO), triethylene glycol di-2-ethylbutyrate (3GH), or triethylene glycol di-2-ethylpropanoate, it is more preferred that the plasticizer include triethylene glycol di-2-ethylhexanoate (3GO), triethylene glycol di-2-ethylbutyrate (3GH), or triethylene glycol di-2-ethylpropanoate, it is further preferred that the plasticizer include triethylene glycol di-2-ethylhexanoate or triethylene glycol di-2-ethylbutyrate, and it is especially preferred that the plasticizer include triethylene glycol di-2-ethylhexanoate.

Each of the content of the plasticizer (2) (hereinafter, sometimes described as the content (2)) relative to 100 parts by weight of the thermoplastic resin (2) and the content of the plasticizer (3) (hereinafter, sometimes described as the content (3)) relative to 100 parts by weight of the thermoplastic resin (3) is preferably 10 parts by weight or more, more preferably 15 parts by weight or more, further preferably 20 parts by weight or more, especially preferably 24 parts by weight or more, and preferably 50 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the flexural rigidity is further enhanced.

The content of the plasticizer (1) (hereinafter, sometimes described as the content (1)) relative to 100 parts by weight of the thermoplastic resin (1) is preferably 50 parts by weight or more, more preferably 55 parts by weight or more, further preferably 60 parts by weight or more, and preferably 100 parts by weight or less, more preferably 90 parts by weight or less, further preferably 85 parts by weight or less, and especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

For the purpose of enhancing the sound insulating properties of laminated glass, it is preferred that the content (1) be larger than the and it is preferred that the content (1) be larger than the content (3).

In particular, from the viewpoint of further enhancing the sound insulating properties of laminated glass, each of the absolute value of the difference between the content (2) and the content (1) and the absolute value of the difference between the content (3) and the content (1) is preferably 10 parts by weight or more, more preferably 15 parts by weight or more, and further preferably 20 parts by weight or more. Each of the absolute value of the difference between the content (2) and the content (1) and the absolute value of the difference between the content (3) and the content (1) is preferably 80 parts by weight or less, more preferably 75 parts by weight or less, and further preferably 70 parts by weight or less.

(Cloud Point)

Cloud point 1 determined with the use of a liquid prepared by dissolving 8 parts by weight of the thermoplastic resin for the first layer in 100 parts by weight of the plasticizer for the first layer is lower than each of Cloud point 2 determined with the use of a liquid prepared by dissolving 8 parts by weight of the thermoplastic resin for the second layer in 100 parts by weight of the plasticizer for the second layer and Cloud point 3 determined with the use of a liquid prepared by dissolving 8 parts by weight of the thermoplastic resin for the third layer in 100 parts by weight of the plasticizer for the third layer. By making the Cloud point 1 lower than each of the Cloud point 2 and the Cloud point 3, the sound insulating properties of laminated glass can be enhanced.

The thermoplastic resin and the plasticizer which are to be contained in the first layer have a Cloud point 1 determined with the use of a liquid prepared by dissolving 8 parts by weight of the thermoplastic resin for the first layer in 100 parts by weight of the plasticizer for the first layer. The thermoplastic resin and the plasticizer which are to be contained in the second layer have a Cloud point 2 determined with the use of a liquid prepared by dissolving 8 parts by weight of the thermoplastic resin for the second layer in 100 parts by weight of the plasticizer for the second layer. The thermoplastic resin and the plasticizer which are to be contained in the third layer have a Cloud point 3 determined with the use of a liquid prepared by dissolving 8 parts by weight of the thermoplastic resin for the third layer in 100 parts by weight of the plasticizer for the third layer.

The Cloud point 1 is preferably lower by 100° C. or less, more preferably lower by 110° C. or less, further preferably lower by 120° C. or less, and especially preferably lower by 130° C. or less, than each of the Cloud point 2 and the Cloud point 3, because the sound insulating properties of laminated glass are further enhanced. That is, it is preferred that the Cloud point 1 be lower than each of the Cloud point 2 and the Cloud point 3 and the absolute value of a difference between the Cloud point 1 and each of the Cloud point 2 and the Cloud point 3 be 100° C. or more (more preferably 110° C. or more, further preferably 120° C. or more, and especially preferably 130° C. or more), because the sound insulating properties of laminated glass are further enhanced. Each of the absolute value of a difference between the Cloud point 1 and the Cloud point 2 and the absolute value of a difference between the Cloud point 1 and the Cloud point 3 is preferably 160° C. or less, more preferably 150° C. or less, further preferably 145° C. or less, and especially preferably 140° C. or less, because the rigidity of laminated glass is further enhanced.

The Cloud point 1 is preferably −25° C. or more, more preferably −20° C. or more, further preferably −15° C. or more, especially preferably −10° C. or more, and preferably 40° C. or less, more preferably 35° C. or less, and further preferably 30° C. or less. When the Cloud point 1 is the above lower limit or more, the rigidity of laminated glass is further enhanced. When the Cloud point 1 is the above upper limit or less, the sound insulating properties of laminated glass are further enhanced.

Each of the Cloud point 2 and the Cloud point 3 is preferably 100° C. or more, more preferably 105° C. or more, further preferably 110° C. or more, especially preferably 115° C. or more, and preferably 190° C. or less, more preferably 185° C. or less, and further preferably 180° C. or less. When the Cloud point 2 and the Cloud point 3 are the above lower limit or more, the rigidity of laminated glass is further enhanced. When the Cloud point 1 is the above upper limit or less, the sound insulating properties of laminated glass are further enhanced.

The cloud point is a cloud point determined in accordance with JIS K2266 "Testing methods for pour point of elude oil and petroleum products and cloud point of petroleum products". Specifically, a cloud point determined with the use of the polyvinyl acetal resin and the plasticizer means a temperature at which, when 3.5 g (100 parts by weight) of a plasticizer and 0.28 g (8 parts by weight) of a polyvinyl acetal resin are prepared, 3.5 g (100 parts by weight) of the plasticizer and 0.28 g (8 parts by weight) of the polyvinyl acetal resin are mixed in a test tube (2 cm in diameter), a solution in which the polyvinyl acetal resin is dissolved in the plasticizer is heated to 150° C. (when cloudiness is not eliminated even if the solution has been heated to 150° C., the heating temperature is increased to a temperature at which the cloudiness of the solution is eliminated (the heating temperature is preferably elevated in 5° C. increments)), and then, the test tube is allowed to stand under an atmosphere of −20° C. to make the temperature of the solution fall to −15° C. or the test tube is allowed to stand under an atmosphere of −196° C. to make the temperature of the solution fall to the pour point temperature of the plasticizer, a part of the solution begins to become cloudy (first cloud point judging method). The lower the cloud point is, the higher the compatibility between a polyvinyl acetal resin and a plasticizer is. In this connection, when the test tube is allowed to stand under an atmosphere of −20° C., the temperature of the solution is made to fall to −15° C., and a part of the solution begins to become cloudy, the tube is allowed to stand under an atmosphere of −20° C. instead of an atmosphere of −196° C.

Accordingly, at the time of evaluating the cloud point, 8 parts by weight of a polyvinyl acetal resin to be contained in the first layer and 100 parts by weight of a plasticizer to be contained in the first layer are prepared, and then, a liquid prepared by dissolving 8 parts by weight of the polyvinyl acetal resin in 100 parts by weight of the plasticizer is used.

Examples of a measurement method for the temperature (cloud point) at which a part of the solution begins to become cloudy include a method of visually observing the appearance of a solution, a method of measuring the haze of a solution with a haze meter, a method of preparing boundary samples for plural stages of cloudiness levels beforehand and comparing a cloudiness with the boundary sample to judge the cloudiness, and the like. Above all, a method of visually observing the appearance of a solution is preferred. When the haze of a solution is measured with a haze meter, the temperature at which a haze value becomes 10% or more is defined as the cloud point.

Moreover, the cloud point determined with the use of the polyvinyl acetal resin and the plasticizer can also be determined based on whether or not the haze value is 10% or more in accordance with a method of determination as indicated below. 3.5 g (100 parts by weight) of the plasticizer and 0.28 g (8 parts by weight) of the polyvinyl acetal resin are prepared, 3.5 g (100 parts by weight) of the plasticizer and 0.28 g (8 parts by weight) of the polyvinyl acetal resin are mixed in a test tube (2 cm in diameter), a solution in which the polyvinyl acetal resin is dissolved in the plasticizer is heated to 150° C., then, the test tube is allowed to stand for 1 hour in a constant temperature room at a prescribed temperature, and then the haze of the solution in the test tube is measured with a haze meter while maintaining the temperature of the constant temperature room (second cloud point judging method). For example, the test tube is allowed to stand for 1 hour in each of the constant temperature rooms at 5° C., 0° C., and −5° C., after which the haze of a solution in the test tube may be measured with a haze meter, while maintaining the temperature of the constant temperature room, to determine the temperature at which a haze value of 10% or more is indicated.

In the present invention, the cloud point may be judged by the first cloud point judging method and may be judged by the second cloud point judging method. Although it is preferred that the cloud point be judged by the first cloud point judging method, for the purpose of specifying a cloud point with higher accuracy or the like, the second cloud point judging method is also adoptable.

Furthermore, each of Absolute value XA of a difference between the Cloud point 1 and the Cloud point 2 and Absolute value XB of a difference between the Cloud point 1 and the Cloud point 3 is 118° C. or more, and when a content of the plasticizer in the interlayer film for laminated glass relative to 100 parts by weight of the thermoplastic resin in the interlayer film for laminated glass is defined as Y, XA, XB, and Y satisfy the equations of $Y \leq -0.16XA+60$ (hereinafter, also referred to as Equation 1) and $Y \leq -0.16XB+60$ (hereinafter, also referred to as Equation 2). Each of the Absolute value XA of a difference between the Cloud point 1 and the Cloud point 2 and the Absolute value XB of a difference between the Cloud point 1 and the Cloud point 3 is preferably 120° C. or more, more preferably 121.5° C. or more, further preferably 123° C. or more, especially preferably 125° C. or more, and preferably 160° C. or less, more preferably 155° C. or less, further preferably 150° C. or less, and especially preferably 140° C. or less. When the Absolute value XA of a difference between the Cloud point and the Cloud point 2 and the Absolute value XB of a difference between the Cloud point 1 and the Cloud point 3 are the above lower limit or more, the sound insulating properties of laminated glass are further enhanced, and when the Absolute value XA and the Absolute value XB are the above upper limit or less, the rigidity of laminated glass is further enhanced.

The content Y and XA preferably satisfy the equation of $Y \leq -0.16XA+60$, more preferably satisfy the equation of $Y \leq -0.16XA+59.5$ and further preferably satisfy the equation of $Y \leq -0.16XA+59$, because the rigidity of laminated glass is further enhanced. The content Y and XA preferably satisfy the equation of $Y \geq -0.16XA+51$, more preferably satisfy the equation of $Y \geq -0.16XA+52$, further preferably satisfy the equation of $Y \geq -0.16XA+53$, and especially preferably satisfy the equation of $Y \geq -0.16XA+54$, because the sound insulating properties of laminated glass are further enhanced. The content Y and XB preferably satisfy the equation of $Y \leq -0.16XB+60$, more preferably satisfy the equation of $Y \leq -0.16XB+59.5$ and further preferably satisfy the equation of $Y \leq -0.16XB+59$, because the rigidity of laminated glass is further enhanced. The content Y and XB preferably satisfy the equation of $Y \geq -0.16XB+51$, more preferably satisfy the equation of $Y \geq -0.16XB+52$, further preferably satisfy the equation of $Y \geq -0.16XB+53$, and especially preferably satisfy the equation of $Y \geq -0.16XB+54$, because the sound insulating properties of laminated glass are further enhanced.

Furthermore, the content Y is preferably 25 parts by weight or more, more preferably 26 parts by weight or more, and further preferably 27 parts by weight or more because the sound insulating properties of laminated glass are further enhanced. The content Y is preferably 41 parts by weight or less, more preferably 40.5 parts by weight or less, and further preferably 40 parts by weight or less because the rigidity of laminated glass is further enhanced.

A conventional sound insulating film has a layered structure with a stack of a surface layer, a sound insulating layer, and a surface layer and the sound insulating layer is softer than the surface layer. Laminated glass prepared with such a sound insulating film is made low in rigidity. In order to prevent laminated glass from being made low in rigidity due to the sound insulating layer, US 2013/0236711 A1 discloses a technique for making a surface layer have a high glass transition temperature. However, only by making a surface layer have a high glass transition temperature, sufficient rigidity of laminated glass immediately after the preparation fails to be attained, and in addition, there is a problem that the rigidity of laminated glass is significantly lowered when a certain period of time has elapsed from the preparation. On the other hand, when a sound insulating layer is made harder, there is a problem that sufficient sound insulating properties fail to be attained. On that account, as a result of researches on the cause of these problems, the present inventors found out that these problems are attributed to the transfer of a plasticizer contained in the surface layer or the sound insulating layer. That is, the rigidity not only of laminated glass immediately after the preparation but also of laminated glass after a certain period of time has elapsed from the preparation can be enhanced as long as a plasticizer contained in the surface layer can be prevented from excessively transferring to the sound insulating layer and a plasticizer contained in the sound insulating layer can be prevented from excessively transferring to the surface layer.

A concrete means for solving these problems will be described. First of all, the Cloud point 1 is lower than the Cloud point 2 and Absolute value XA of a difference between the Cloud point 1 and the Cloud point 2 is 118° C. or more.

When a content of the plasticizer in the interlayer film for laminated glass relative to 100 parts by weight of the thermoplastic resin in the interlayer film for laminated glass is defined as Y, XA, XB, and Y satisfy the equations of $Y \leq -0.16XA+60$ and $Y \leq -0.16XB+60$. The plasticizer in the second layer and the plasticizer in the third layer have a tendency to transfer into the first layer as the difference between the Cloud point 1 and the Cloud point 2 and the difference between the Cloud point 1 and the Cloud point 3 become large. On that account, even if Absolute value XA of a difference between the Cloud point 1 and the Cloud point 2 and Absolute value XB of a difference between the Cloud point 1 and the Cloud point 3 become large, by decreasing the content Y of the plasticizer in the interlayer film for laminated glass, namely, the total numerical value of parts of the plasticizer in the interlayer film for laminated glass, relative to 100 parts by weight of the thermoplastic resin in the interlayer film for laminated glass, the rigidity not only of laminated glass immediately after the preparation but also of laminated glass after a certain period of time has elapsed from the preparation can be enhanced. On the other hand, the plasticizer in the second layer and the plasticizer in the third layer have a tendency not to transfer into the first layer as the difference between the Cloud point 1 and the Cloud point 2 and the difference between the Cloud point 1 and the Cloud point 3 become small. On that account, even if Absolute value XA of a difference between the Cloud point 1 and the Cloud point 2 and Absolute value XB of a difference between the Cloud point 1 and the Cloud point 3 become small, by increasing the content Y of the plasticizer in the interlayer film for laminated glass, namely, the total numerical value of parts of the plasticizer in the interlayer film for laminated glass, relative to 100 parts by weight of the thermoplastic resin in the interlayer film for laminated glass, the sound insulating properties of laminated glass can be enhanced.

In this context, the content Y of the plasticizer in the interlayer film for laminated glass relative to 100 parts by weight of the thermoplastic resin in the interlayer film for laminated glass will be described. An interlayer film for laminated glass is cut into a size of 0.5 cm in longitudinal length by 5 cm in transversal length, and in the case of the three-layer structure with a stack of the second layer, the first layer, and the third layer, the interlayer film for laminated glass is allowed to stand for 12 hours under an environment of 23±2° C. and a humidity of 25±5% in order to enhance the measurement accuracy, after which the second layer is peeled off from the first layer, and then, the third layer is peeled off from the first layer. The weight of the peeled first layer is measured with the use of an electronic balance for analysis (GH-200 available from A&D Company, Limited) and the weight of the peeled first layer is defined as X1 (mg). With the use of a gas chromatograph (GC-2014 available from SHIMADZU CORPORATION), the peeled first layer is measured for the percentage content (R1) occupied by the thermoplastic resin in the total of the thermoplastic resin and the plasticizer contained in the first layer and the percentage content (P1) occupied by the plasticizer in the total of the thermoplastic resin and the plasticizer contained in the first layer. In this connection, R1 mentioned above is calculated by dividing the content of the thermoplastic resin in the first layer by the total content of the thermoplastic resin and the plasticizer in the first layer and P1 mentioned above is calculated by dividing the content of the plasticizer in the first layer by the total content of the thermoplastic resin and the plasticizer in the first layer. Similarly, the weight X2 (mg) of the second layer, the percentage content (R2) occupied by the thermoplastic resin in the total of the thermoplastic resin and the plasticizer contained in the second layer, and the percentage content (P2) occupied by the plasticizer in the total of the thermoplastic resin and the plasticizer contained in the second layer are measured. Similarly, the weight X3 (mg) of the third layer, the percentage content (R3) occupied by the thermoplastic resin in the total of the thermoplastic resin and the plasticizer contained in the third layer, and the percentage content (P3) occupied by the plasticizer in the total of the thermoplastic resin and the plasticizer contained in the third layer are measured. Furthermore, the content of the thermoplastic resin in the first layer is calculated as X1 (mg)×R1, the content of the thermoplastic resin in the second layer is calculated as X2 (mg)×R2, the content of the thermoplastic resin in the third layer is calculated as X3 (mg)×R3, and the content of the thermoplastic resin in the interlayer film for laminated glass is defined as X1 (mg)×R1+X2 (mg)×R2+X3 (mg)×R3. Similarly, the content of the plasticizer in the first layer is calculated as X1 (mg)×P1, the content of the plasticizer in the second layer is calculated as X2 (mg)×P2, the content of the plasticizer in the third layer is calculated as X3 (mg)×P3, and the content of the plasticizer in the interlayer film for laminated glass is defined as X1 (mg)×P1+X2 (mg)×P2+X3 (mg)×P3. From these results, the content Y of the plasticizer in the interlayer film for laminated glass relative to 100 parts by weight of the thermoplastic resin in the interlayer film for laminated glass is calculated as [{X1 (mg)×P1+X2 (mg)×P2+X3 (mg) P3}/{X1 (mg)×R1+X2 (mg)×R2+X3 (mg)×R3}]. When the interlayer film for laminated glass has a four or more-layer multilayer structure, it is preferred that the first layer, the second layer, and the third layer be specified to measure the content Y of the plasticizer in the interlayer film for laminated glass relative to 100 parts by weight of the thermoplastic resin in the interlayer film for laminated glass as in the case of an interlayer film having a three-layer structure. In this connection, when at least one layer of the first layer, the second layer, and the third layer has a colored region and the colored region exists only on an area extending along the in-plane direction of an interlayer film for laminated glass, it is preferred that the interlayer film for laminated glass be cut into a size of 0.5 cm in longitudinal length by 5 cm in transversal length so as not to include the colored region, and then, the content Y of the plasticizer in the interlayer film for laminated glass relative to 100 parts by weight of the thermoplastic resin in the interlayer film for laminated glass be measured.

(Silica Particles)

It is preferred that the first layer contains silica particles. By the use of silica particles, without lowering the sound insulating properties, the rigidity is further enhanced, and furthermore, the adhesive force between respective layers is also enhanced. One kind of the silica particle may be used alone and two or more kinds thereof may be used in combination.

The specific surface area by the BET method of the silica particle is preferably 50 $m^2/g$ or more, more preferably 100 $m^2/g$ or more, further preferably 200 $m^2/g$ or more, especially preferably 250 $m^2/g$ or more, most preferably 300 $m^2/g$ or more, and preferably 500 $m^2/g$ or less. The specific surface area can be measured by a gas adsorption method using a specific surface area/fine pore distribution measuring apparatus. Examples of the measuring apparatus include "ASAP 2420" available from SHIMADZU CORPORATION, and the like.

Relative to 100 parts by weight of the thermoplastic resin (1), the content of the silica particle is preferably 1 part by weight or more, more preferably 5 parts by weight or more, further preferably 10 parts by weight or more, especially preferably 15 parts by weight or more, and preferably 70 parts by weight or less, more preferably 64 parts by weight or less, even more preferably 60 parts by weight or less, further preferably 55 parts by weight or less, especially preferably 45 parts by weight or less, and most preferably 35 parts by weight or less. When the content of the silica particle is the above lower limit or more, the adhesive force between respective layers is further enhanced and the rigidity is further enhanced. When the content of the silica particle is the above upper limit or less, the sound insulating properties are further enhanced.

(Heat Shielding Compound)

It is preferred that the interlayer film include a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be used in combination.

Ingredient X:

It is preferred that the interlayer film include at least one kind of Ingredient X among a phthalocyanine compound, a naphthalocyanine compound and an anthracyanine compound. It preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably 0.001% by weight or more, more preferably 0.005% by weight or more, further preferably 0.01% by weight or more, especially preferably 0.02% by weight or more, and preferably 0.2% by weight or less, more preferably 0.1% by weight or less, further preferably 0.05% by weight or less and especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and preferably 0.1 μm or less and more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer or a third layer), each content of the heat shielding particles is preferably 0.01% by weight or more, more preferably 0.1% by weight or more, further preferably 1% by weight or more, especially preferably 1.5% by weight or more, and preferably 6% by weight or less, more preferably 5.5% by weight or less, further preferably 4% by weight or less, especially preferably 3.5% by weight or less and most preferably 3% by weight or less. When the content of the heat shielding particles is the above lower limit or more and the above upper limit or less, the heat shielding properties are sufficiently enhanced and the visible light transmittance is sufficiently enhanced.

(Metal Salt)

It is preferred that the interlayer film include at least one kind of metal salt (hereinafter, sometimes described as Metal salt M) among an alkali metal salt, an alkaline earth metal salt, and an Mg salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member or the adhesivity between respective layers in the interlayer film is facilitated. One kind of the Metal salt M may be used alone and two or more kinds thereof may be used in combination.

It is preferred that the Metal salt M contain at least one kind of metal selected from the group consisting of Li, Na, K, Rb, Cs, Mg, Ca, Sr, and Ba. It is preferred that the metal salt contained in the interlayer film contain at least one kind of metal between K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer, or a third layer) is preferably 5 ppm or more, more preferably 10 ppm or more, further preferably 20 ppm or more, and preferably 300 ppm or less, more preferably 250 ppm or less, and further preferably 200 ppm or less. When the total of the contents of Mg and K is the above lower limit or more and the above upper limit or less, the adhesivity between the interlayer film and a lamination glass member or the adhesivity between respective layers in the interlayer film can be further well controlled.

(Ultraviolet Ray Screening Agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure, an ultraviolet ray screening agent having a benzophenone structure, an ultraviolet ray screening agent having a triazine structure, an ultraviolet ray screening agent having a malonic acid ester structure, an ultraviolet ray screening agent having an oxanilide structure, an ultraviolet ray screening agent having a benzoate structure, and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the ultraviolet ray screening agent having a benzotriazole structure include ultraviolet ray screening agents having a benzotriazole structure such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of a layer containing the ultraviolet ray screening agent (a first layer, a second layer or a third layer), the content of the ultraviolet ray screening agent is preferably 0.1% by weight or more, more preferably 0.2% by weight or more, further preferably 0.3% by weight or more, especially preferably 0.5% by weight or more, and preferably 2.5% by weight or less, more preferably 2% by weight or less, further preferably 1% by weight or less and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer and the third layer may contain additives such as a coupling agent containing silicon, aluminum or titanium, a dispersing agent, a surfactant, a flame retardant, an antistatic agent, a pigment, a dye, an adhesive force regulating agent, a moisture-resistance improving agent, a fluorescent brightening agent and an infrared ray absorber, as necessary. One kind of these additives may be used alone, and two or more kinds thereof may be used in combination.

(Other Details of Interlayer Film for Laminated Glass)

From the viewpoint of enhancing the flexural rigidity of laminated glass, the equivalent stiffness at 25° C. of the interlayer film is 2.4 MPa or more. From the viewpoint of further enhancing the flexural rigidity of laminated glass, the equivalent stiffness at 25° C. of the interlayer film is preferably 3 MPa or more, more preferably 4 MPa or more, further preferably 5 MPa or more, and especially preferably 9 MPa or more. The equivalent stiffness at 25° C. of the interlayer film is preferably 30 MPa or less and more preferably 20 MPa or less.

In this connection, in order to enhance the equivalent stiffness, it is preferred that the first layer contain silica particles. Moreover, in order to enhance the equivalent stiffness, the degree of crosslinking of a thermoplastic resin in the first layer may be moderately enhanced. Furthermore, in order to enhance the equivalent stiffness, it is preferred that the thickness of each layer be appropriately selected.

From the viewpoint of further enhancing the sound insulating properties of laminated glass, the glass transition temperature of the first layer is preferably 15° C. or less, more preferably 10° C. or less, further preferably 5° C. or less, and especially preferably 0° C. or less. The glass transition temperature of the first layer is preferably −20° C. or more.

From the viewpoint of further enhancing the flexural rigidity of laminated glass, it is preferred that the glass transition temperature of the first layer be lower than the glass transition temperature of each of the second layer and the third layer. By making the first layer, which has a glass transition temperature lower than that of each of the second layer and the third layer, contain silica particles and providing an interlayer film with the second layer and the third layer which have a glass transition temperature higher than that of the first layer, the flexural rigidity of laminated glass is significantly improved. From the viewpoint of still further enhancing the flexural rigidity of laminated glass, the absolute value of a difference between the glass transition temperature of the first layer and the glass transition temperature of each of the second layer and the third layer is preferably 10° C. or more, more preferably 20° C. or more, further preferably 30° C. or more, and especially preferably 35° C. or more. The absolute value of a difference between the glass transition temperature of the first layer and the glass transition temperature of each of the second layer and the third layer is preferably 70° C. or less.

Examples of a method of measuring the glass transition temperature include a method of measuring an interlayer film obtained for the viscoelasticity with the use of a viscoelasticity measuring apparatus "DVA-200" available from IT KEISOKU SEIGYO K.K. immediately after being stored for 12 hours under an environment of a room temperature of 23±2° C. and a humidity of 25±5%. It is preferred that the interlayer film be cut into a size of 8 mm in longitudinal width by 5 mm in lateral width and be measured, using the shear mode, for the glass transition temperature under the condition in which the temperature is increased from −30° C. to 100° C. at a temperature increasing rate of 5° C./minute and under the condition of a frequency of 1 Hz and a strain of 0.08%.

From the viewpoint of enhancing the flexural rigidity of laminated glass, the Young's modulus at 25° C. of the first layer is preferably 0.4 MPa or more, more preferably 0.6 MPa or more, further preferably 0.8 MPa or more, and preferably 6 MPa or less, more preferably 5 MPa or less, and further preferably 4 MPa or less.

From the viewpoint of enhancing the flexural rigidity of laminated glass, the Young's modulus at 25° C. of each of the second layer and the third layer is preferably 3 MPa or more, more preferably 10 MPa or more, further preferably 100 MPa or more, and preferably 700 MPa or less, more preferably 500 MPa or less, and further preferably 400 MPa or less.

In this connection, in order to adjust the Young's modulus within a moderate range, it is preferred that the first layer contain silica particles. Moreover, in order to adjust the Young's modulus within a moderate range, the degree of crosslinking of a thermoplastic resin in the first layer may be moderately enhanced.

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and preferably 3 mm or less, more preferably 2 mm or less, and further preferably 1.5 mm or less. When the thickness of the interlayer film is the above lower limit or more, the penetration resistance and the flexural rigidity of laminated glass are enhanced. When the thickness of the interlayer film is the above upper limit or less, the transparency of the interlayer film is further improved.

The thickness of the interlayer film is defined as T. The thickness of the first layer is preferably 0.0625T or more, more preferably 0.1T or more, and preferably 0.4T or less, more preferably 0.375T or less, further preferably 0.25T or less, and still further preferably 0.15T or less. When the thickness of the first layer is 0.4T or less, the flexural rigidity is further improved.

The thickness of each of the second layer and the third layer is preferably 0.3T or more, more preferably 0.3125T or more, further preferably 0.375T or more, and preferably 0.9375T or less, and more preferably 0.9T or less. The thickness of each of the second layer and the third layer may be 0.46875T or less and may be 0.45T or less. Moreover, when the thickness of each of the second layer and the third layer is the above lower limit or more and the above upper limit or less, the rigidity and the sound insulating properties of laminated glass are further enhanced.

The total thickness of the second layer and the third layer is preferably 0.6251 or more, more preferably 0.75T or more, further preferably 0.85T or more, and preferably 0.9375T or less, and more preferably 0.9T or less. Moreover, when the total thickness of the second layer and the third layer is the above lower limit or more and the above upper limit or less, the rigidity and the sound insulating properties of laminated glass are further enhanced.

The production method of the interlayer film according to the present invention is not particularly limited. Examples of the production method of the interlayer film according to the present invention include a method of separately forming respective resin compositions used for constituting respective layers into respective layers, and then, for example, layering the respective obtained layers, a method of coextruding respective resin compositions used for constituting respective layers with an extruder and layering the respective layers, and the like. A production method of extrusion-molding is preferred because the method is suitable for continuous production.

Since the production efficiency of the interlayer film is excellent, it is preferred that respective polyvinyl acetal resins contained in the second layer and the third layer be the same as each other, it is more preferred that respective polyvinyl acetal resins contained in the second layer and the third layer be the same as each other and respective plasticizers contained therein be the same as each other, and it is further preferred that the second layer and the third layer be formed from the same resin composition as each other.

It is preferred that at least one surface among surfaces of both sides of the interlayer film have a recess/protrusion shape. It is more preferred that surfaces of both sides of the interlayer film have a recess/protrusion shape. The method for forming the recess/protrusion shape is not particularly limited, and examples thereof include a lip emboss method, an embossing roll method, a calender roll method, a profile extrusion method, and the like. Since it is possible to quantitatively form many embosses with a recess/protrusion shape constituting a constant uneven pattern, the embossing roll method is preferred.

(Laminated Glass)

FIG. 2 is a sectional view schematically showing an example of laminated glass prepared with the interlayer film for laminated glass shown in FIG. 1.

The laminated glass 31 shown in FIG. 2 is provided with a first lamination glass member 21, a second lamination glass member 22, and an interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of a second layer 2. The second lamination glass member 22 is layered on an outer surface 3a of a third layer 3.

As described above, the laminated glass according to the present invention is provided with a first lamination glass member, a second lamination glass member, and an interlayer film and the interlayer film is the interlayer film for laminated glass according to the present invention. In the laminated glass according to the present invention, the above-mentioned interlayer film is arranged between the first lamination glass member and the second lamination glass member.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, and preferably 5 mm or less, and more preferably 3 mm or less. Moreover, when the lamination glass member is a glass plate, the thickness of the glass plate is preferably 0.5 mm or more, more preferably 0.7 mm or more, and preferably 5 mm or less, and more preferably 3 mm or less. When the lamination glass member is a PET film, the thickness of the PET film is preferably 0.03 mm or more and preferably 0.5 mm or less.

By the use of the interlayer film according to the present invention, the flexural rigidity of laminated glass can be maintained high even when the thickness of the laminated glass is thinned. From the viewpoints of attaining reduced weight of laminated glass and decreasing the amount of the material for laminated glass to reduce the environmental load, and improving fuel consumption of an automobile by reduction in weight of laminated glass to reduce the environmental load, the thickness of the glass plate is preferably 2 mm or less, more preferably less than mm, even more preferably 1.8 mm or less, even more preferably 1.5 mm or less, further preferably 1 mm or less, still further preferably 0.8 mm or less, and especially preferably 0.7 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained. At the time of producing the laminated glass, a first layer, a second layer, and a third layer may be layered.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is suitably used for obtaining laminated glass of an automobile.

From the viewpoint of obtaining laminated glass further excellent in transparency, the visible light transmittance of laminated glass is preferably 65% or more and more preferably 70% or more. The visible light transmittance of laminated glass can be measured in accordance with JIS R3211 (1998). It is preferred that the visible light transmittance of laminated glass obtained by sandwiching the interlayer film for laminated glass according to the present invention between two sheets of green glass (heat ray-absorbing plate glass) with a thickness of 2 mm in accordance with JIS R3208 be 70% or more. The visible light transmittance is more preferably 75% or more.

Hereinafter, the present invention will be described in more detail with reference to examples. The present invention is not limited only to these examples.

The following materials were prepared.

(Polyvinyl Acetal Resin)

Polyvinyl acetal resins shown in the following Tables 1 and 2 were used. In all polyvinyl acetal resins used, n-butyraldehyde which has 4 carbon atoms is used for the acetalization. With regard to the polyvinyl acetal resin, the acetalization degree (the butyralization degree), the acetylation degree, and the content of the hydroxyl group were measured by a method in accordance with JIS K6728 "Testing methods for polyvinyl butyral". In this connection, even in the cases of being measured according to ASTM 91396-92, numerical values similar to those obtained by a method in accordance with JIS K6728 "Testing methods for polyvinyl butyral" were exhibited.

(Plasticizer)

Triethylene glycol di-2-ethylhexanoate (3GO)

(Ultraviolet Ray Screening Agent)

Tinuvin 326 (2-(2'-hydroxy-3'-t-butyl-5-methylphenyl)-5-chlorobenzotriazole, "Tinuvin 326" available from BASF Japan Ltd.)

(Oxidation Inhibitor)

BHT (2,6-di-t-butyl-p-cresol)

Example 1

Preparation of Composition for Forming First Layer:

One hundred parts by weight of a polyvinyl acetal resin of a kind shown in the following Table 1, 60 parts by weight of a plasticizer (3GO), 0.2 parts by weight of an ultraviolet ray screening agent (Tinuvin 326), and 0.2 parts by weight of an oxidation inhibitor (BHT) were mixed to obtain a composition for forming a first layer.

Preparation of Composition for Forming Second and Third Layers:

One hundred parts by weight of a polyvinyl acetal resin of a kind shown in the following Table 1, 34 parts by weight of a plasticizer (3GO), 0.2 parts by weight of an ultraviolet ray screening agent (Tinuvin 326), and 0.2 parts by weight of an oxidation inhibitor (BHT) were mixed to obtain a composition for forming a second layer and a third layer.

Preparation of Interlayer Film:

The composition for forming a first layer and the composition for forming a second layer and a third layer were coextruded with a coextruder to prepare an interlayer film (780 μm in thickness) having a layered structure with a stack of a second layer (340 μm in thickness)/a first layer (100 μm in thickness)/a third layer (340 μm in thickness).

Preparation of Laminated Glass A (for Flexural Rigidity Measurement):

Two washed and dried glass plates (clear float glass, 25 cm in longitudinal length×10 cm in transversal length×0.7 mm in thickness) were prepared. The obtained interlayer film was sandwiched between the two glass plates to obtain a laminate. The obtained laminate was put into a rubber bag and the inside thereof was degassed for 20 minutes at a degree of vacuum of 2660 Pa (20 torr). Afterward, while being degassed, furthermore, the laminate was held in place for 30 minutes at 90° C. and pressed under vacuum in an autoclave. The laminate thus preliminarily press-bonded was subjected to press-bonding for 20 minutes under conditions of 135° C. and a pressure of 1.2 MPa (12 kg/cm$^2$) in an autoclave to obtain a sheet of Laminated glass A.

Preparation of Laminated Glass B (for Sound Insulating Properties Measurement):

The obtained interlayer film was cut into a size of 30 cm in longitudinal length×2.5 cm in transversal length. Next, between two sheets of green glass (30 cm in longitudinal length×2.5 cm in transversal length×2 mm in thickness) in accordance with JIS R3208, the interlayer film was sandwiched to obtain a laminate. The laminate was put into a rubber bag and the inside thereof was degassed for 20 minutes at a degree of vacuum of 2.6 kPa, after which the laminate was transferred into an oven while being degassed, and furthermore, held in place for 30 minutes at 90° C. and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of Laminated glass B.

Examples 2 to 12 and Comparative Examples 1 to 10

An interlayer film and a sheet of laminated glass were obtained in the same manner as that in Example 1 except that the kind and blending amount of each of the polyvinyl acetal resin and the plasticizer which are used for a composition for forming a first layer and a composition for forming a second layer and a third layer were set to those listed in the following Tables 1 and 2 and the thicknesses of the first layer, the second layer, and the third layer were set to those listed in the following Tables 1 and 2. Moreover, in Examples 2 to 12 and Comparative Examples 1 to 10, each of the ultraviolet ray screening agent and the oxidation inhibitor of the same kind as that in Example 1 was blended in the same blending amount (0.2 parts by weight relative to 100 parts by weight of the polyvinyl acetal resin) as that in Example 1.

(Evaluation)

(1) Absolute Value of Difference Between Cloud Point 1 and Cloud Point 2 and Absolute Value of Difference Between Cloud Point 1 and Cloud Point 3

Three and five tenths grams (100 parts by weight) of a plasticizer used in the first layer of the respective examples and comparative examples and 0.28 g (8 parts by weight) of a polyvinyl acetal resin used in the first layer of the respective examples and comparative examples were prepared. In a test tube (2 cm in diameter), 3.5 g (100 parts by weight) of the first plasticizer and 0.28 g (8 parts by weight) of the polyvinyl acetal resin were mixed to obtain a solution in which the first plasticizer is made to dissolve the polyvinyl acetal resin. The solution in the test tube was heated to 150° C. (when cloudiness was not eliminated even if the solution had been heated to 150° C., the heating temperature was elevated in 5° C. increments and the heating temperature was increased to a temperature at which the cloudiness of the solution was eliminated), after which the test tube was allowed to stand under an atmosphere of −20° C. to make the temperature of the solution fall to −15° C. On this occasion, the temperature at which a phenomenon of a part of the solution beginning to become cloudy is visually observed was defined as Cloud point 1. Similarly, a plasticizer used in each of the second layer and the third layer of the respective examples and comparative examples and a polyvinyl acetal resin used in each of the second layer and the third layer of the respective examples and comparative examples were used to be determined for each of Cloud point 2 and Cloud point 3. Then, an absolute value of a difference between Cloud point 1 and Cloud point 2 and an absolute value of a difference between Cloud point 1 and Cloud point 3 were calculated.

(2) Measurement of Content Y of Plasticizer in Interlayer Film for Laminated Glass Relative to 100 Parts by Weight of Polyvinyl Acetal Resin in Interlayer Film for Laminated Glass An interlayer film for laminated glass was cut into a size of 0.5 cm in longitudinal length by 5 cm in transversal length, and in the case of the three-layer structure with a stack of the second layer, the first layer, and the third layer, the interlayer film for laminated glass was allowed to stand for 12 hours under an environment of 23±2° C. and a humidity of 25±5%, after which the second layer was peeled off from the first layer, and then, the third layer was peeled off from the first layer. The weight of the peeled first layer was measured with the use of an electronic balance for analysis (GH-200 available from A&D Company, Limited) and the weight of the peeled first layer was defined as X1 (mg). With the use of a gas chromatograph (GC-2014 available from SHIMADZU CORPORATION), the peeled first layer was measured for the percentage content (R1) occupied by the polyvinyl acetal resin in the total of the polyvinyl acetal resin and the plasticizer contained in the first layer and the percentage content (P1) occupied by the plasticizer in the total of the polyvinyl acetal resin and the plasticizer contained in the first layer. In this connection, R1 mentioned above was calculated by dividing the content of the polyvinyl acetal resin in the first layer by the total content of the polyvinyl acetal resin and the plasticizer in the first layer and P1 mentioned above was calculated by dividing the content of the plasticizer in the first layer by the total content of the polyvinyl acetal resin and the plasticizer in the first layer. Similarly, the weight X2 (mg) of the second layer, the percentage content (R2) occupied by the polyvinyl acetal resin in the total of the polyvinyl acetal resin and the plasticizer contained in the second layer, and the percentage content (P2) occupied by the plasticizer in the total of the polyvinyl acetal resin and the plasticizer contained in the second layer were measured. Similarly, the weight X3 (mg) of the third layer, the percentage content (R3) occupied by the polyvinyl acetal resin in the total of the polyvinyl acetal resin and the plasticizer contained in the third layer, and the percentage content (P3) occupied by the plasticizer in the total of the polyvinyl acetal resin and the plasticizer contained in the third layer were measured. Furthermore, the content of the polyvinyl acetal resin in the first layer was calculated as X1 (mg)×R1, the content of the polyvinyl acetal resin in the second layer was calculated as X2 (mg)×R2, the content of the polyvinyl acetal resin in the third layer was calculated as X3 (mg)×R3, and the content of the polyvinyl acetal resin in the interlayer film for laminated glass was defined as X1 (mg)×R1+X2 (mg)×R2+X3 (mg)×R3. Similarly, the content of the plasticizer in the first layer was calculated as X1 (mg)×P1, the content of the plasticizer in the second layer was calculated as X2 (mg)×P2, the content of the plasticizer in the third layer was calculated as X3 (mg)×P3, and the content of the plasticizer in the interlayer film for laminated glass was defined as X1 (mg)×P1+X2 (mg)×P2+X3 (mg)×P3. From the results, the content Y of the plasticizer in the interlayer film for laminated glass relative to 100 parts by weight of the polyvinyl acetal resin in the interlayer film for laminated glass was calculated as [{X1 (mg)×P1+X2 (mg)×P2+X3 (mg)×P3}/{X1 (mg)×R1+X2 (mg)×R2+X3 (mg)×R3}]. In this connection, the percentage content (R1) occupied by the polyvinyl acetal resin in the first layer and the percentage content (P1) occupied by the plasticizer therein were determined by the GC measurement according to the following procedure. A 0.05-g portion of a film obtained by being peeled off was weighed accurately and dissolved in 4 ml of a solvent in which methanol and chloroform were mixed at a weight ratio of 1:1. With 1.9 ml of a 1:1 mixed solvent of methanol/chloroform, 0.1 ml of the mixed-solvent solution was diluted. The solution after dilution was filtered through a syringe filter of 0.2 μm to prepare a solution for GC measurement. GC measurement conditions were set as follows. The inlet temperature was set to 280° C., HP-5 (0.32 mmΦ×30 m×0.25 μm, available from Agilent Technologies Japan, Ltd.) was used as a column, and the column temperature was set so as to be maintained for 1 minute at 80° C., then, elevated at 20° C./minute, and maintained for 30 seconds at 320° C. Helium was adopted as a carrier gas, the flow rate was set to 2.0 ml/minute, and the split ratio was set to 1:10. The injection volume of a sample solution was set to 2 μl, a hydrogen flame ionization detector (FID) was used as a detector, and the temperature of the detector was set to 320° C. With the use of a calibration curve of the plasticizer prepared in advance on the same day, the percentage content (P1) of the plasticizer in the sample solution was calculated. Moreover, the percentage content (R1) of the polyvinyl acetal resin was calculated from the formula of 1−P1. Although additives other than the polyvinyl acetal resin and the plasticizer contained in the interlayer film are also included in the percentage content R1, this may be ignored because these additives are contained in trace amounts. Similarly, the second layer and the third layer were also subjected to the GC measurement.

(3) Flexural Rigidity

The sheet of Laminated glass A obtained was prepared. The flexural rigidity was evaluated by the testing method schematically shown in FIG. 3. As a measuring apparatus, the universal testing machine 5966, which is available from INSTRON Japan Co., Ltd. and equipped with the static 3-point flexural test jig 2810, was used. Under measurement conditions of the measurement temperature of 20±3° C., the distance D1 of 18 cm, and the distance D2 of 25 cm, a sheet of laminated glass was deformed in the F direction at a displacement rate of 1 mm/minute and the stress at the time when the deformation amount becomes 1.5 mm was measured to calculate the flexural rigidity.

(4) Sound Insulating Properties

A sheet of Laminated glass B was excited by means of a vibration generator for a damping test ("Vibration exciter G21-005D" available from SHINKEN CO., LTD.) to obtain vibration characteristics, the vibration characteristics were amplified by a mechanical impedance measuring apparatus ("XG-81" available from RION Co., Ltd.), and the vibration spectrum was analyzed by an FFT spectrum analyzer ("FFT analyzer HP3582A" available from Yokogawa-Hewlett-Packard, Ltd.).

From the ratio of the loss factor thus obtained to the resonance frequency of laminated glass, a graph showing the relationship between the sound frequency (Hz) and the sound transmission loss (dB) at 20° C. was prepared to determine the minimum sound transmission loss (TL value) at a sound frequency of about 2,000 Hz. The higher this TL value is, the higher in sound insulating properties of laminated glass is. The sound insulating properties were judged according to the following criteria.

[Criteria for Judgment in Sound Insulating Properties]

◯: The TL value is 35 dB or more.

x: The TL value is less than 35 dB.

The details and the results are shown in the following Tables 1 and 2. In this connection, in the following Tables 1 and 2, the description of ingredients to be blended other than the polyvinyl acetal resin and the plasticizer was omitted.

TABLE 1

| | | | | Example 1 | Example 2 | Example 3 | Example 4 | Example 5 | Example 6 |
|---|---|---|---|---|---|---|---|---|---|
| Composition for forming first layer | Polyvinyl acetal resin | Thickness | μm | 100 | 100 | 100 | 100 | 100 | 100 |
| | | Average polymerization degree of PVB | | 3000 | 3000 | 3000 | 3000 | 3000 | 3000 |
| | | Content of hydroxyl group | % by mole | 23.8 | 23.8 | 23.8 | 23.8 | 23.1 | 23.1 |
| | | Acetylation degree | % by mole | 12.1 | 12.1 | 12.1 | 12.1 | 12.5 | 12.5 |

TABLE 1-continued

|  |  |  |  |  |  |  |  |  |
|---|---|---|---|---|---|---|---|---|
|  |  | Acetalization degree | % by mole | 64.1 | 64.1 | 64.1 | 64.1 | 64.5 | 64.5 |
|  |  | Content | Parts by weight | 100 | 100 | 100 | 100 | 100 | 100 |
|  | Plasticizer | Kind |  | 300 | 300 | 300 | 300 | 300 | 300 |
|  |  | Content | Parts by weight | 60 | 60 | 60 | 60 | 60 | 60 |
|  | Cloud point 1 |  | ° C. | 26.3 | 26.3 | 26.3 | 26.3 | 21.6 | 21.6 |
| Composition | Respective thicknesses |  | μm | 340 | 340 | 340 | 340 | 340 | 340 |
| for forming | Polyvinyl | Average |  | 1700 | 1700 | 1700 | 1700 | 1700 | 1700 |
| second and | acetal resin | polymerization |  |  |  |  |  |  |  |
| third layers |  | degree of PVA |  |  |  |  |  |  |  |
|  |  | Content of hydroxyl group | % by mole | 34.5 | 34.5 | 34.5 | 34.5 | 33.2 | 33.2 |
|  |  | Acetylation degree | % by mole | 0.8 | 0.8 | 0.8 | 0.8 | 0.8 | 0.8 |
|  |  | Acetalization degree | % by mole | 64.7 | 64.7 | 64.7 | 64.7 | 66 | 66 |
|  |  | Content | Parts by weight | 100 | 100 | 100 | 100 | 100 | 100 |
|  | Plasticiiar | Kind |  | 300 | 300 | 300 | 300 | 300 | 300 |
|  |  | Content | Parts by weight | 34 | 32 | 30 | 28 | 36 | 34 |
|  | Cloud point 2 and Cloud point 3 |  | ° C. | 165.1 | 165.1 | 165.1 | 165.1 | 152.0 | 152.0 |
| Absolute value XA of difference between Cloud point 1 and Cloud point 2 |  |  | ° C. | 138.8 | 138.8 | 138.8 | 138.8 | 130.4 | 130.4 |
| Absolute value XB of difference between Cloud point 1 and Cloud point 3 |  |  |  |  |  |  |  |  |  |
| Absolute value of difference between content of hydroxyl group of polyvinyl acetal resin in first layer and content of hydroxyl group of polyvinyl acetal resin in each of second and third layers |  |  | % by mole | 10.7 | 10.7 | 10.7 | 10.7 | 10.1 | 10.1 |
|  | Content Y |  | Parts by weight | 36.9 | 35.0 | 33.2 | 31.4 | 38.7 | 36.9 |
| Evaluation | Flexural rigidity | δ (1D) | N/nm | 11.90 | 12.56 | 13.19 | 13.80 | 11.32 | 12.03 |
|  |  | δ (3H) | N/nm | 9.13 | 9.79 | 10.42 | 11.03 | 8.97 | 9.65 |
|  | Sound insulating properties: TL method |  |  | ○ | ○ | ○ | ○ | ○ | ○ |

|  |  |  |  | Example 7 | Example 8 | Example 9 | Example 10 | Example 11 | Example 12 |
|---|---|---|---|---|---|---|---|---|---|
| Composition | | Thickness | μm | 100 | 100 | 100 | 100 | 100 | 100 |
| for forming | Polyvinyl | Average |  | 3000 | 3000 | 3000 | 3000 | 3000 | 3000 |
| first layer | acetal resin | polymerization degree of PVB |  |  |  |  |  |  |  |
|  |  | Content of hydroxyl group | % by mole | 23.1 | 23.1 | 23.1 | 23.1 | 23.1 | 23.1 |
|  |  | Acetylation degree | % by mole | 12.5 | 12.5 | 12.5 | 12.5 | 12.5 | 12.5 |
|  |  | Acetalization degree | % by mole | 64.5 | 64.5 | 64.5 | 64.5 | 64.5 | 64.5 |
|  |  | Content | Parts by weight | 100 | 100 | 100 | 100 | 100 | 100 |
|  | Plasticizer | Kind |  | 300 | 300 | 300 | 300 | 300 | 300 |
|  |  | Content | Parts by weight | 60 | 60 | 60 | 60 | 60 | 60 |
|  | Cloud point 1 |  | ° C. | 21.6 | 21.6 | 21.6 | 21.6 | 21.6 | 21.6 |
| Composition | Respective thicknesses |  | μm | 340 | 340 | 340 | 340 | 340 | 340 |
| for forming | Polyvinyl | Average |  | 1700 | 1700 | 1700 | 1700 | 1700 | 1700 |
| second and | acetal resin | polymerization degree of PVA |  |  |  |  |  |  |  |
| third layers |  | Content of hydroxyl group | % by mole | 33.2 | 33.2 | 32.5 | 32.5 | 32.5 | 32.5 |
|  |  | Acetylation degree | % by mole | 0.8 | 0.8 | 0.8 | 0.8 | 0.8 | 0.8 |
|  |  | Acetalization degree | % by mole | 66 | 66 | 66.7 | 66.7 | 66.7 | 66.7 |
|  |  | Content | Parts by weight | 100 | 100 | 100 | 100 | 100 | 100 |
|  | Plasticiiar | Kind |  | 300 | 300 | 300 | 300 | 300 | 300 |
|  |  | Content | Parts by weight | 32 | 30 | 37 | 35 | 33 | 31 |
|  | Cloud point 2 and Cloud point 3 |  | ° C. | 152.0 | 152.0 | 145.0 | 145.0 | 145.0 | 145.0 |
| Absolute value XA of difference between Cloud point 1 and Cloud point 2 |  |  | ° C. | 130.4 | 130.4 | 123.4 | 123.4 | 123.4 | 123.4 |
| Absolute value XB of difference between Cloud point 1 and Cloud point 3 |  |  |  |  |  |  |  |  |  |

TABLE 1-continued

|  |  |  |  |  |  |  |  |
|---|---|---|---|---|---|---|---|
| Absolute value of difference between content of hydroxyl group of polyvinyl acetal resin in first layer and content of hydroxyl group of polyvinyl acetal resin in each of second and third layers | | % by mole | 10.1 | 10.1 | 9.4 | 9.4 | 9.4 | 9.4 |
| | Content Y | Parts by weight | 35.0 | 33.2 | 39.6 | 37.8 | 35.9 | 34.1 |
| Evaluation | Flexural rigidity δ (1D) | N/nm | 12.71 | 13.36 | 10.87 | 11.61 | 12.32 | 13.00 |
| | δ (3H) | N/nm | 10.30 | 10.92 | 8.85 | 9.54 | 10.20 | 10.84 |
| | Sound insulating properties: TL method | | ○ | ○ | ○ | ○ | ○ | ○ |

TABLE 2

| | | | | Comparative Example 1 | Comparative Example 2 | Comparative Example 3 | Comparative Example 4 | Comparative Example 5 |
|---|---|---|---|---|---|---|---|---|
| Composition for forming first layer | | Thickness | μm | 100 | 100 | 100 | 100 | 100 |
| | Polyvinyl acetal resin | Average polymerization degree of PVB | | 3000 | 3000 | 3000 | 3000 | 3000 |
| | | Content of hydroxyl group | % by mole | 23.8 | 23.1 | 23.1 | 23.8 | 23.1 |
| | | Acetylation degree | % by mole | 12.1 | 12.5 | 12.5 | 12.1 | 12.5 |
| | | Acetalization degree | % by mole | 64.1 | 64.5 | 64.5 | 64.1 | 64.5 |
| | | Content | Parts by weight | 100 | 100 | 100 | 100 | 100 |
| | Plasticizer | Kind | | 300 | 300 | 300 | 300 | 300 |
| | | Content | Parts by weight | 60 | 60 | 60 | 60 | 60 |
| | | Cloud point 1 | ° C. | 26.3 | 21.6 | 21.6 | 26.3 | 21.6 |
| Composition for forming second and third layers | | Respective thicknesses | μm | 340 | 340 | 340 | 340 | 340 |
| | Polyvinyl acetal resin | Average polymerization degree of PVA | | 1700 | 1700 | 1700 | 1700 | 1700 |
| | | Content of hydroxyl group | % by mole | 34.5 | 33.2 | 32.5 | 34.5 | 33.2 |
| | | Acetylation degree | % by mole | 0.8 | 0.8 | 0.8 | 0.8 | 0.8 |
| | | Acetalization degree | % by mole | 64.7 | 66 | 66.7 | 64.7 | 66 |
| | | Content | Parts by weight | 100 | 100 | 100 | 100 | 100 |
| | Plasticizar | Kind | | 300 | 300 | 300 | 300 | 300 |
| | | Content | Parts by weight | 36 | 38 | 39 | 38 | 40 |
| | | Cloud point 2 and Cloud point 3 | ° C. | 165.1 | 152.0 | 145.0 | 165.1 | 152.0 |
| Absolute value XA of difference between Cloud point 1 and Cloud point 2 Absolute value XB of difference between Cloud point 1 and Cloud point 3 | | | ° C. | 138.8 | 130.4 | 123.4 | 138.8 | 130.4 |
| Absolute value of difference between content of hydroxyl group of polyvinyl acetal resin in first layer and content of hydroxyl group of polyvinyl acetal resin in each of second and third layers | | | % by mole | 10.7 | 10.1 | 9.4 | 10.7 | 10.1 |
| | Content Y | | Parts by weight | 38.7 | 40.5 | 41.4 | 40.5 | 42.3 |
| Evaluation | Flexural rigidity | δ (1D) | N/nm | 11.20 | 10.58 | 10.10 | 10.49 | 9.81 |
| | | δ (3H) | N/nm | 8.44 | 8.26 | 8.13 | 7.70 | 7.52 |
| | Sound insulating properties: TL method | | | ○ | ○ | ○ | ○ | ○ |

| | | | | Comparative Example 6 | Comparative Example 7 | Comparative Example 8 | Comparative Example 9 | Comparative Example 10 |
|---|---|---|---|---|---|---|---|---|
| Composition for forming first layer | | Thickness | μm | 100 | 127 | 127 | 127 | 127 |
| | Polyvinyl acetal resin | Average polymerization degree of PVB | | 3000 | 2300 | 2300 | 2300 | 2300 |
| | | Content of hydroxyl group | % by mole | 23.1 | 18.4 | 18.4 | 18.4 | 18.4 |
| | | Acetylation degree | % by mole | 12.5 | 1.7 | 1.7 | 1.7 | 1.7 |
| | | Acetalization degree | % by mole | 64.5 | 79.9 | 79.9 | 79.9 | 79.9 |
| | | Content | Parts by weight | 100 | 100 | 100 | 100 | 100 |

TABLE 2-continued

|  |  |  |  |  |  |  |  |  |
|---|---|---|---|---|---|---|---|---|
|  | Plasticizer | Kind |  | 300 | 300 | 300 | 300 | 300 |
|  |  | Content | Parts by weight | 60 | 75 | 75 | 75 | 75 |
|  |  | Cloud point 1 | ° C. | 21.6 | 3.7 | 3.7 | 3.7 | 3.7 |
| Composition for forming second and third layers |  | Respective thicknesses | μm | 340 | 330 | 356 | 330 | 330 |
|  | Polyvinyl acetal resin | Average polymerization degree of PVA |  | 1700 | 1700 | 1700 | 1700 | 1700 |
|  |  | Content of hydroxyl group | % by mole | 32.5 | 30.1 | 27.2 | 29.4 | 29.4 |
|  |  | Acetylation degree | % by mole | 0.8 | 1.7 | 1.7 | 1.7 | 1.7 |
|  |  | Acetalization degree | % by mole | 66.7 | 68.2 | 71.1 | 68.9 | 68.9 |
|  |  | Content | Parts by weight | 100 | 100 | 100 | 100 | 100 |
|  | Plasticizar | Kind |  | 300 | 300 | 300 | 300 | 300 |
|  |  | Content | Parts by weight | 41 | 35 | 38 | 35 | 34 |
|  |  | Cloud point 2 and Cloud point 3 | ° C. | 145.0 | 121.0 | 91.9 | 114.0 | 114.0 |
| Absolute value XA of difference between Cloud point 1 and Cloud point 2 Absolute value XB of difference between Cloud point 1 and Cloud point 3 |  |  | ° C. | 123.4 | 117.2 | 88.2 | 110.2 | 110.2 |
| Absolute value of difference between content of hydroxyl group of polyvinyl acetal resin in first layer and content of hydroxyl group of polyvinyl acetal resin in each of second and third layers |  |  | % by mole | 9.4 | 11.7 | 8.8 | 11.0 | 11.0 |
|  |  | Content Y | Parts by weight | 43.2 | 40.2 | 42.6 | 40.2 | 39.3 |
| Evaluation | Flexural rigidity | δ (1D) | N/nm | 9.31 | 9.76 | 8.19 | 9.87 | 10.08 |
|  |  | δ (3H) | N/nm | 7.40 | 8.03 | 7.54 | 8.15 | 8.24 |
|  |  | Sound insulating properties: TL method |  | ○ | ○ | ○ | ○ | ○ |

EXPLANATION OF SYMBOLS

1: First layer
1a: First surface
1b: Second surface
2: Second layer
2a: Outer surface
3: Third layer
3a: Outer surface
11: Interlayer film
11A: Interlayer film (First layer)
11a: First surface
11b: Second surface
21: First lamination glass member
22: Second lamination glass member
31: Laminated glass

The invention claimed is:

1. An interlayer film for laminated glass, having a three or more-layer structure and containing a thermoplastic resin and a plasticizer, comprising:
a first layer containing a thermoplastic resin and a plasticizer;
a second layer being layered on a first surface of the first layer and containing a thermoplastic resin and a plasticizer; and
a third layer being layered on a second surface opposite to the first surface of the first layer and containing a thermoplastic resin and a plasticizer;
the thermoplastic resin in the first layer, the thermoplastic resin in the second layer and the thermoplastic resin in the third layer each being a polyvinyl acetal resin, an ethylene-vinyl acetate copolymer resin, an ethylene-acrylic acid copolymer resin, a polyurethane resin or a polyvinyl alcohol resin,
the plasticizer in the first layer, the plasticizer in the second layer and the plasticizer in the third layer each being an organic ester plasticizer, an organic phosphate plasticizer or an organic phosphite plasticizer,
Cloud point 1 determined with the use of a liquid prepared by dissolving 8 parts by weight of the thermoplastic resin for the first layer in 100 parts by weight of the plasticizer for the first layer being lower than each of Cloud point 2 determined with the use of a liquid prepared by dissolving 8 parts by weight of the thermoplastic resin for the second layer in 100 parts by weight of the plasticizer for the second layer and Cloud point 3 determined with the use of a liquid prepared by dissolving 8 parts by weight of the thermoplastic resin for the third layer in 100 parts by weight of the plasticizer for the third layer,
each of Absolute value XA of a difference between the Cloud point 1 and the Cloud point 2 and Absolute value XB of a difference between the Cloud point 1 and the Cloud point 3 being 118° C. or more,
when a content of the plasticizer in the interlayer film for laminated glass relative to 100 parts by weight of the thermoplastic resin in the interlayer film for laminated glass is defined as Y XA, XB, and Y satisfying the equations of $Y \leq -0.16 XA + 60$ and $Y \leq -0.16 XB + 60$, and
a content Y of the plasticizer being calculated as $[\{X1 (mg) \times P1 + X2 (mg) \times P2 + X3 (mg) \times P3\}/\{X1 (mg) \times R1 + X2 (mg) \times R2 + X3 (mg) \times R3\}]$, wherein
X1 is the weight of the first layer,
R1 is the percentage content occupied by the thermoplastic resin contained in the first layer in the total of the thermoplastic resin and the plasticizer contained in the first layer,
P1 is the percentage content occupied by the plasticizer contained in the first layer in the total of the thermoplastic resin and the plasticizer contained in the first layer, X2 is the weight of the second layer, R2 is the percentage content occupied by the thermoplastic resin contained in the second layer in the total of the thermoplastic resin and the plasticizer contained in the second layer, P2 is the percentage content occupied by the plasticizer contained in the second layer in the total of the thermoplastic resin and the plasticizer contained in the second layer, X3 is the weight of the third layer, R3 is the percentage content occupied by the thermoplastic resin contained in the third layer in the total of the thermoplastic resin and the plasticizer contained in the third layer, and P3 is the percentage content occupied by the plasticizer contained in the third layer in the total of the thermoplastic resin and the plasticizer contained in the third layer.

2. The interlayer film for laminated glass according to claim 1, wherein the content of the plasticizer in the first layer relative to 100 parts by weight of the thermoplastic resin in the first layer is larger than the content of the plasticizer in the second layer relative to 100 parts by weight of the thermoplastic resin in the second layer.

3. The interlayer film for laminated, glass according to claim 1, wherein the content of the plasticizer in the first layer relative to 100 parts by weight of the thermoplastic resin in the first layer is larger than the content of the plasticizer in the third layer relative to 100 parts by weight of the thermoplastic resin in the third layer.

4. The interlayer film for laminated glass according to claim 1, wherein the Cloud point 1 is 0° C. or more and 40° C. or less.

5. The interlayer film for laminated glass according to claim 4, wherein the Cloud point 1 is more than 5° C. and 30° C. or less.

6. The interlayer film for laminated glass according to claim 1, wherein each of the Cloud point 2 and the Cloud point 3 is 125° C. or more and 180° C. or less.

7. The interlayer film for laminated glass according to claim 6, wherein each of the Cloud point 2 and the Cloud point 3 is 135° C. or more and 170° C. or less.

8. The interlayer film for laminated glass according to claim 1, wherein the content of the plasticizer in the first layer relative to 100 parts by weight of the thermoplastic resin in the first layer is 55 parts by weight or more and 100 parts by weight or less.

9. The interlayer film for laminated glass according to claim 1, wherein each of the content of the plasticizer in the second layer relative to 100 parts by weight of the thermoplastic resin in the second layer and the content of the plasticizer in the third layer relative to 100 parts by weight of the thermoplastic resin in the third layer is 50 parts by weight or less.

10. The interlayer film for laminated glass according to claim 1, wherein the content Y of the plasticizer in the interlayer film for laminated glass relative to 100 parts by weight of the thermoplastic resin in the interlayer film for laminated glass is 25 parts by weight or more and 40 parts by weight or less.

11. The interlayer film for laminated glass according to claim 1, wherein the thermoplastic resin in the first layer is a polyvinyl acetal resin, the thermoplastic resin in the second layer is a polyvinyl acetal resin, and the thermoplastic resin in the third layer is a polyvinyl acetal resin.

12. The interlayer film for laminated glass according to claim 11, wherein a content of hydroxyl group of the polyvinyl acetal resin in the first layer is lower than a content of hydroxyl group of the polyvinyl acetal resin in the second layer.

13. The interlayer film for laminated glass according to claim 1, being used together with a first glass plate having a thickness of less than 2 mm and being arranged between the first glass plate and a second glass plate to obtain laminated glass.

14. A laminated glass, comprising:

a first lamination glass member;

a second lamination glass member; and the interlayer film for laminated glass according to claim 1, the interlayer film for laminated glass being arranged between the first lamination glass member and the second lamination glass member.

15. The laminated glass according to claim 14, wherein the first lamination glass member is a first glass plate and the thickness of the first glass plate is less than 2 mm.

* * * * *